United States Patent
Walkowski et al.

(10) Patent No.: US 7,147,019 B2
(45) Date of Patent: Dec. 12, 2006

(54) FILLER NECK COVER

(75) Inventors: Paul D. Walkowski, Ann Arbor, MI (US); Robert P. Benjey, Dexter, MI (US); Russell C. Jahnke, Ann Arbor, MI (US); Andrew W. McIntosh, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/047,071

(22) Filed: Jan. 31, 2005

(65) Prior Publication Data

US 2006/0169354 A1   Aug. 3, 2006

(51) Int. Cl.
 *B65B 1/04* (2006.01)
(52) U.S. Cl. ............ 141/350; 141/301; 220/86.2; 220/DIG. 33
(58) Field of Classification Search .......... 141/301, 141/349, 350; 220/86.2, DIG. 33
See application file for complete search history.

(56) References Cited

U.S. PATENT DOCUMENTS

| | | | |
|---|---|---|---|
| 2,294,190 A | 8/1942 | Lee | |
| 2,338,192 A | 1/1944 | Martin | |
| 5,547,099 A * | 8/1996 | Chang | 220/212.5 |
| 5,732,842 A * | 3/1998 | Krause et al. | 220/254.1 |
| 6,009,920 A | 1/2000 | Palvoelgyi | |
| 6,092,685 A | 7/2000 | Gruber | |
| 6,155,316 A | 12/2000 | Benjey | |
| 6,539,990 B1 * | 4/2003 | Levey et al. | 141/301 |
| 6,789,586 B1 * | 9/2004 | Levey | 141/350 |

FOREIGN PATENT DOCUMENTS

EP  1 312 497   5/2003

OTHER PUBLICATIONS

PCT Search Report, PCT/IB2006/000166 search completed May 10, 2006.

* cited by examiner

*Primary Examiner*—Steven O. Douglas
(74) *Attorney, Agent, or Firm*—Anna M. Shih

(57) ABSTRACT

A cover for a filler neck includes a body portion and a movable protective door that covers and exposes an opening in the filler neck. The protective door includes a ledge that protrudes from the plane of the door so that the door can be easily moved to an open position by pressing a tip of a fuel nozzle against the door. The door itself may be biased to move into a closed position automatically when the fuel nozzle is removed from the ledge.

17 Claims, 6 Drawing Sheets

US 7,147,019 B2

FILLER NECK COVER

TECHNICAL FIELD

The present invention relates to filler neck closures, and more particularly to a protective cover for a closure in a fuel tank.

BACKGROUND OF THE INVENTION

Vehicle emissions standards have become increasingly stringent due to knowledge of the negative environmental effects of hydrocarbon emissions, which are generated by fuel vapors released into the atmosphere. For vehicles and other fuel-operated devices, controlling and containing fuel vapors is important to reduce emissions. Vehicles contain an on-board diagnostic system that monitors whether the fuel system is completely vapor-tight.

The refueling process requires a user to remove a closure, such as a gas cap, which seals a filler neck in the fuel system when the gas cap is screwed over or onto the filler neck. Screwing and unscrewing the gas cap requires the user to undergo several different steps and motions during the refueling process that must either be conducted with two hands or as separate steps (i.e., it is difficult to unscrew a gas cap and hold a refueling nozzle using the same hand at the same time). Although gas caps having doors or other openings have been proposed in the past, these structures do not form the seals required to meet current stringent emissions requirements. Moreover, these structures tend to leave the opening of the filler neck and any associated flapper door exposed to potentially corrosive environmental contaminants, such as mud, rain, dust, etc.

There is a desire for a structure that can protect an opening in a filler neck from environmental contaminants while allowing the structure to be easily manipulated by the fuel nozzle alone.

SUMMARY OF THE INVENTION

The present invention is directed to a protective cover for a filler neck. The cover includes a body portion and a movable door that covers and exposes an opening in the filler neck. The door includes a ledge that protrudes from the plane of the door so that the door can be easily moved to an open position by pressing a tip of a fuel nozzle against the door and a ledge. In one embodiment, the door slides along a shallow channel formed in the cover. A protrusion structure engages with a slot formed in the channel to guide the door along a fixed path. In another embodiment, the door is movable into and out of a pocket. The door itself may be biased to move into a closed position automatically when the fuel nozzle is removed from the ledge.

The inventive cover may be used in conjunction with a capless filler neck having a flapper that is pulled shut by a latch structure to form a vapor-tight seal.

DETAILED DESCRIPTION OF THE EMBODIMENTS

Figure 1:
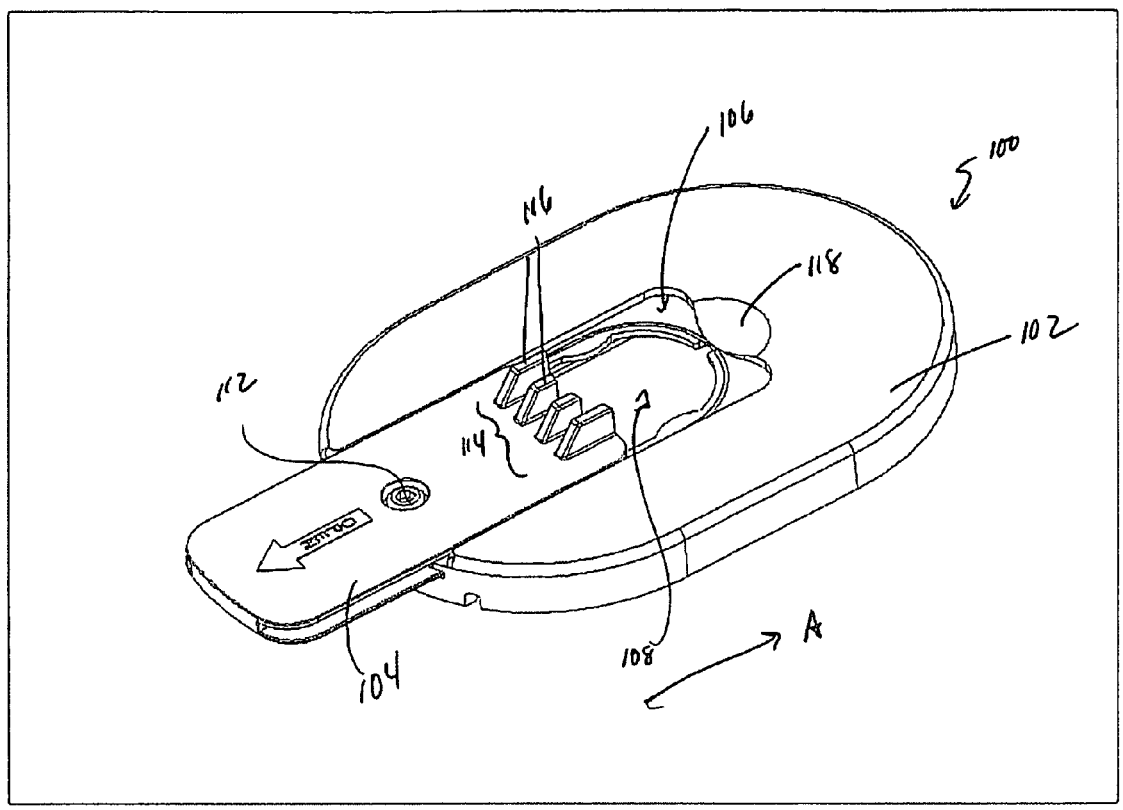
FIG. 1 is a perspective view of a filler neck cover according to one embodiment of the invention in an open position.
Figure 2:
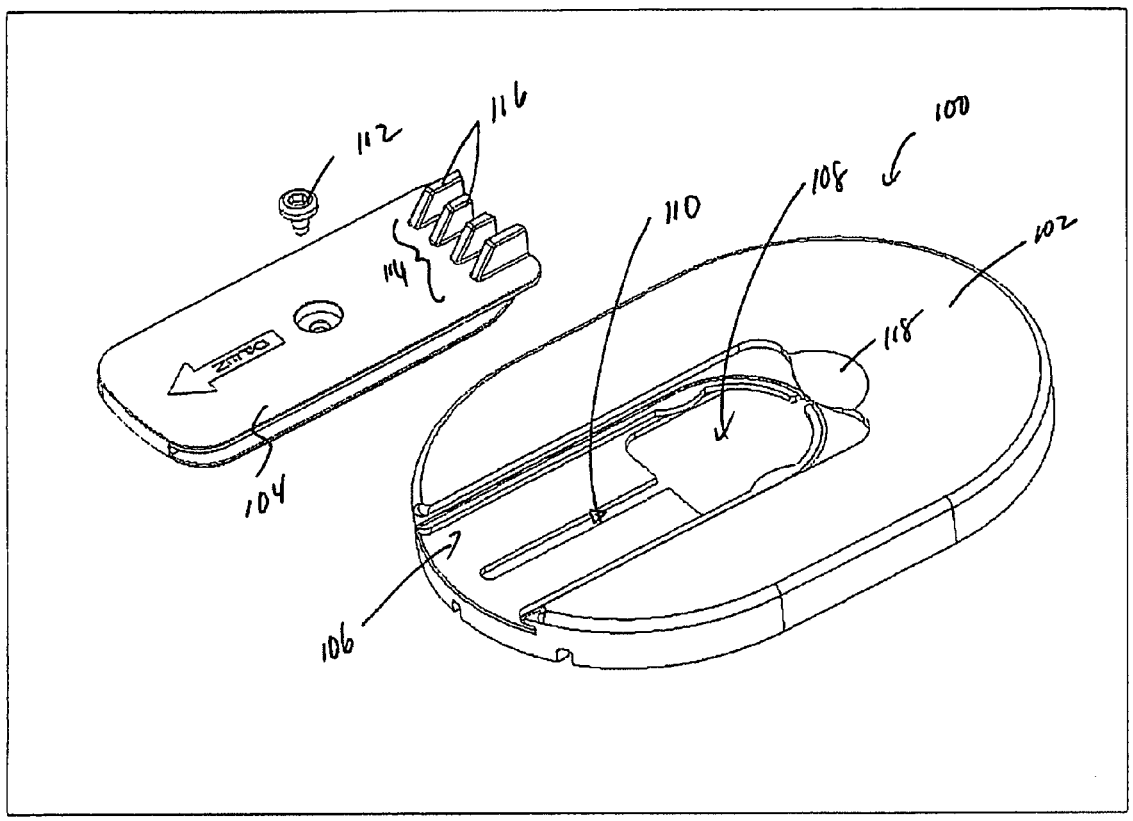
FIG. 2 is an exploded view of the filler neck cover of FIG. 1.
Figure 3:
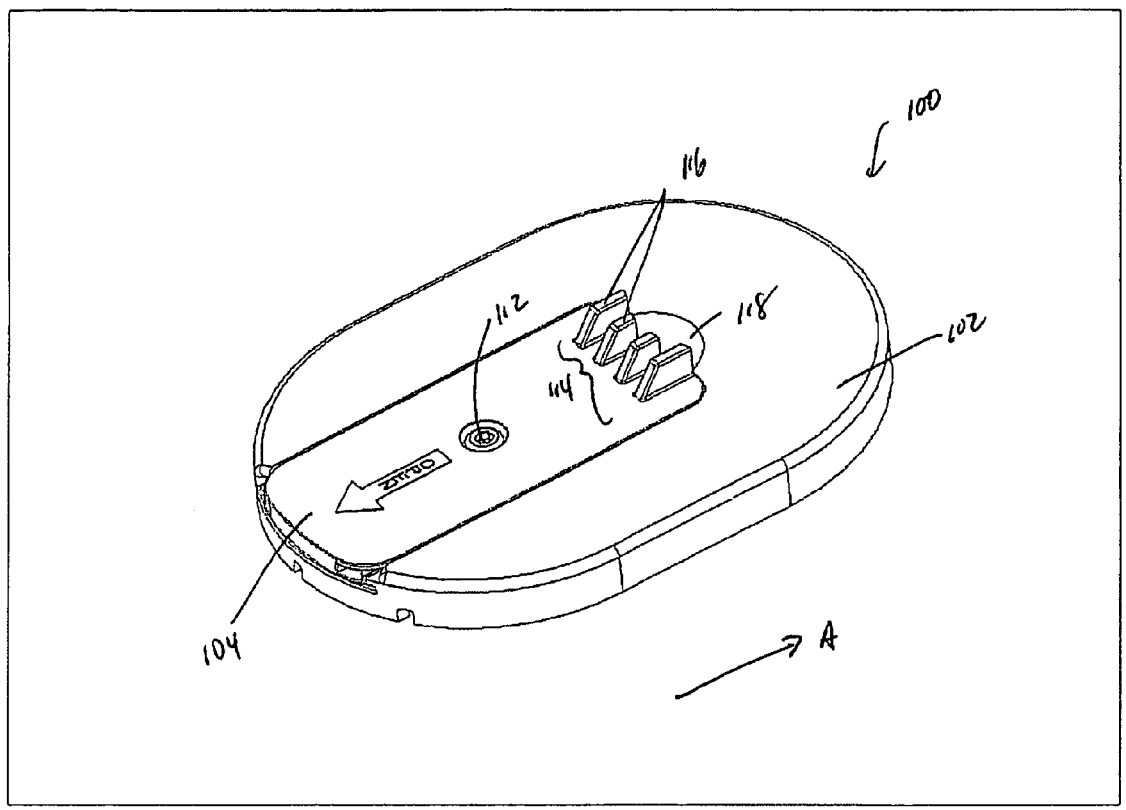
FIG. 3 is a perspective view of the filler neck cover of FIG. 1 in a closed position.

Referring to FIGS. 1 through 3, a protective cover 100 for a filler neck (not shown) in a fuel system comprises a body portion 102 and a movable protective door 104. The cover 100 is preferably made of any material that is durable enough to resist deterioration in harsh environmental conditions over an extended time period, such as plastic. In the illustrated embodiment, the door 104 is slidable along a channel 106 to either expose or cover an opening 108 that can accommodate a fuel nozzle. The opening 108 is aligned with an opening in the filler neck. As shown in FIG. 2, a slot 110 is formed in the channel 106 and extends from the opening 108 to accommodate a retainer 112, such as a pin or bolt, attached to the door 104. The retainer 112 moves along the slot 110 as the door 104 is moved in the direction shown by arrow A so that the door remains attached to the body portion 102 as it slides in the channel 106. The retainer 112 may be used to couple the door 104 to a resilient member (not shown) that biases the door 104 in the direction of arrow A toward a closed position, if desired. Alternatively, a resilient member may be included in the channel 106 on either side of the door 104 like the embodiment shown in FIGS. 4 through 6.

Referring to FIG. 2, the door 104 has a ledge 114 that acts as a support for the tip of the fuel nozzle when the fuel nozzle is used to move the door 114. The ledge 114 can have any configuration that allows the door 104 to be easily opened simply by applying pressure to the ledge 114. In one embodiment, the ledge 114 may be in the form of a plurality of fins 116. The fins 116 may be configured to divert water away from the opening 108. A depression 118 may also be included in the body portion 102 to make manipulation of the door 104 easier.

To open the door 104 in the embodiment of FIGS. 1 and 2, a user may apply downward pressure on the ledge 114 using the tip of the fuel nozzle to slide the door 104 to an open position and expose the opening 108, providing access to the filler neck. As the door 104 is opened, the retainer 112 moves along the slot 110. As long as the fuel nozzle is inside the opening 108, the door 104 will remain held open. If the door 104 is resiliently biased toward the closed position, removing the fuel nozzle from the opening 108 will cause the door 104 to close automatically and cover the opening 108.

Figure 4:
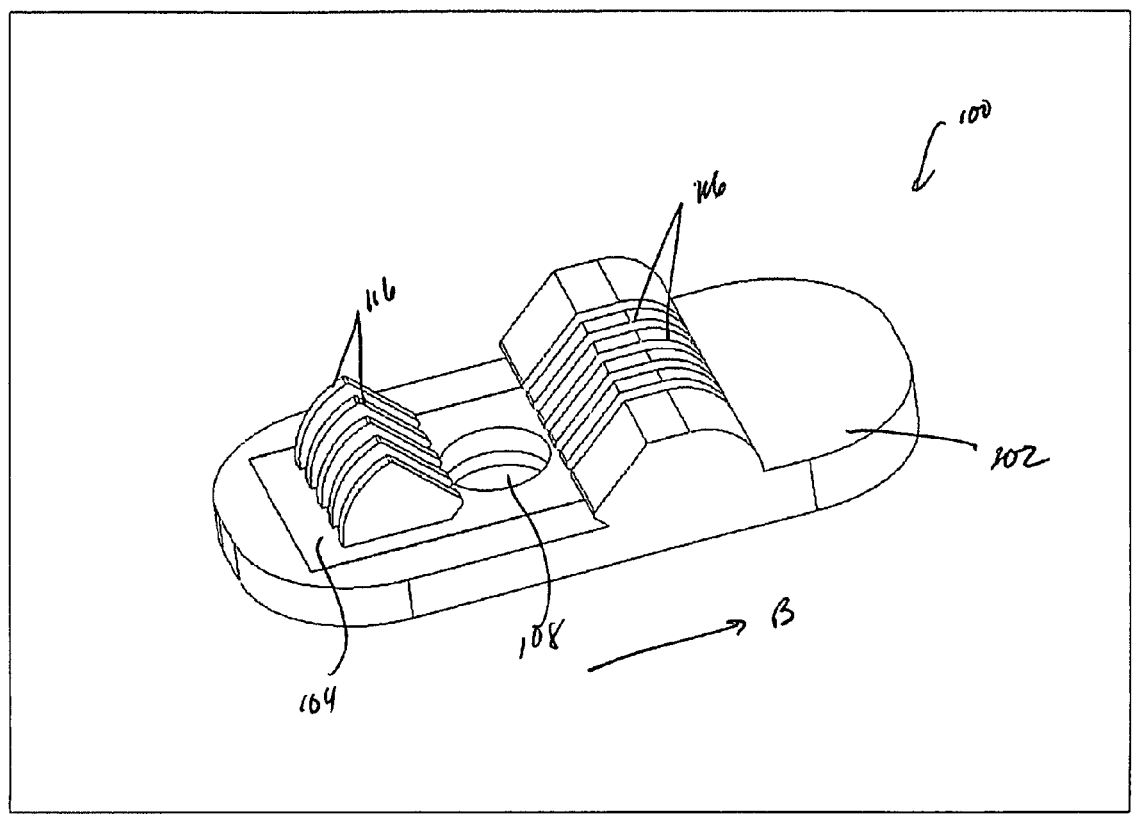
FIG. 4 is a perspective view of a filler neck cover according to another embodiment of the invention in an open position.
Figure 5:
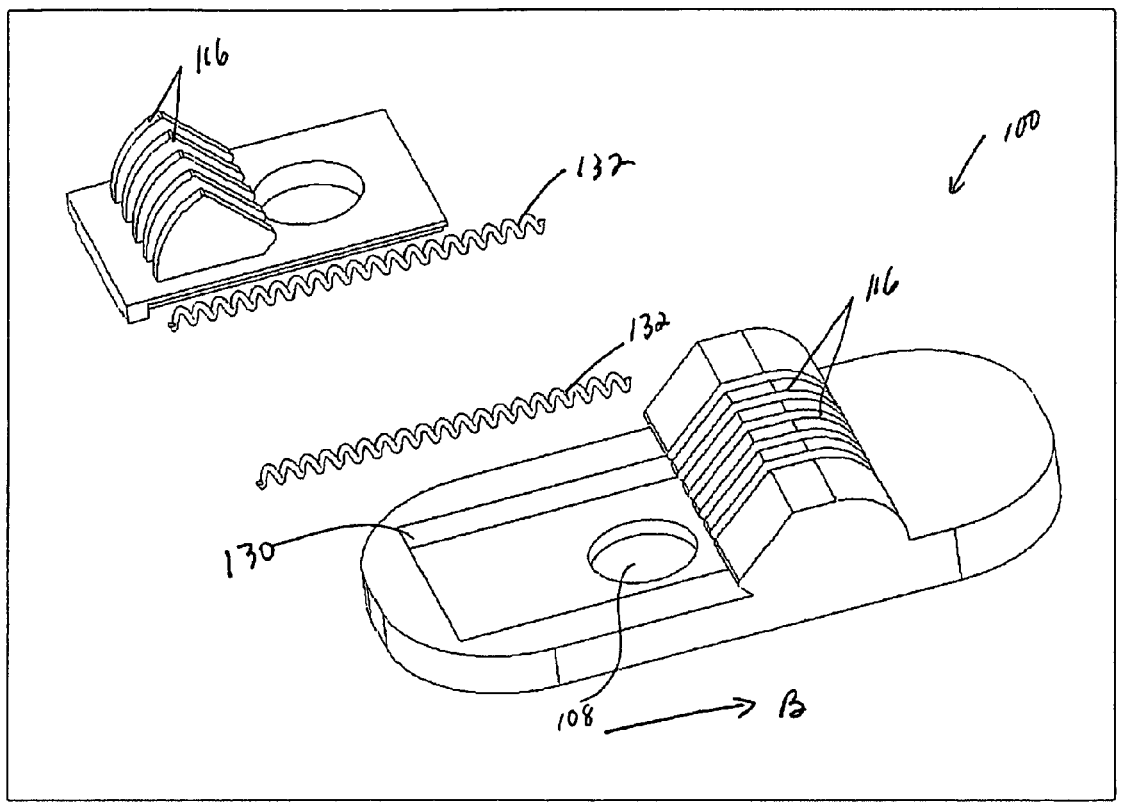
FIG. 5 is an exploded view of the filler neck cover of FIG. 4.
Figure 6:
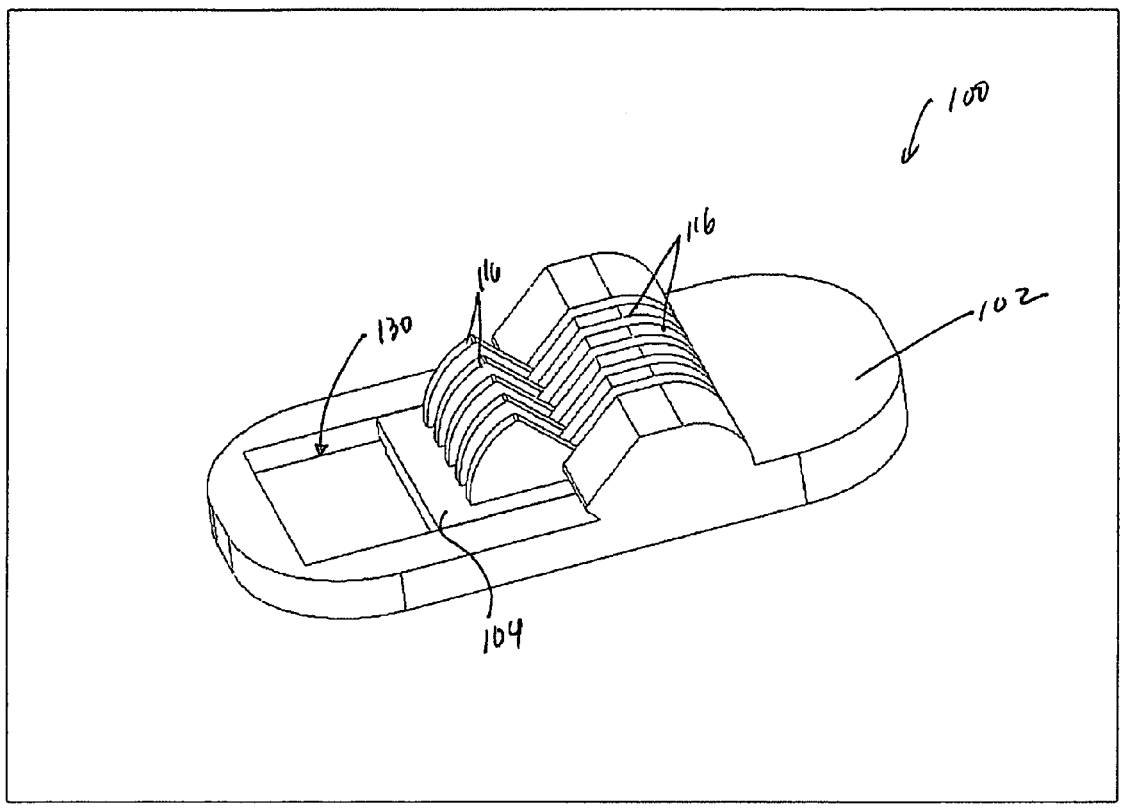
FIG. 6 is a perspective view of the filler neck cover of FIG. 4 in a closed position.

FIGS. 4 through 6 illustrate an alternative embodiment of the invention. In this embodiment, the cover 100 is configured to have a pocket 130 designed to accommodate the door 104. One or more resilient members 132, such as springs, may be disposed within the pocket 130 to bias the door 104 in the direction of arrow B toward a closed position. In this embodiment, fins 116 may be placed on both the door 104 and the body portion 102 so that the fins 116 on the door 104 are offset from the fins 116 on the body portion 102. When the door 104 is in a closed position, the fins 116 on the door 104 interleave with the fins 116 on the body portion 102 to provide reliable protection of the filler neck. The fins 116 may each have a beveled surface 134 so that the nozzle can easily access the opening 108 when the nozzle is pressed against the beveled surfaces 134 of the fins 116 at the point where they interleave. Continued insertion of the nozzle into the filler neck will push the door 104 upward against the biasing force of the resilient member 132, exposing the opening 108. When the nozzle is removed from the opening 108 in the cover 100, the biasing force of the resilient member 132 pulls at least a portion of the door 104 within the pocket 130, closing the door 104 and covering the opening 108 automatically.

FIGS. 7 and 8 illustrate a further embodiment of the invention. Like the embodiments described above, this embodiment has a door 104 that slides when a fuel nozzle is pressed against it. In this embodiment, the fins 116 on the door 104 do not interleave with the fins 116 on the body portion 102; instead, at least one of the fins 116 have a contoured profile so that the nozzle can fit against the contour. Resilient members 132 may be tucked in the channel 106 on either side of the door 104 to bias the door 104 toward the closed position.

By incorporating a protective door that is movable to cover and reveal a filler neck, the inventive filler neck cover protects the filler neck opening and any associated closures (e.g. a flapper door) from being contaminated or damaged by environmental factors. The inventive cover may be part of a capless filler neck system that closes and seals itself automatically, such as the one described in U.S. application Ser. No. 11/047,201, filed Jan. 31, 2005. If the inventive structure is used in an automatically sealing capless filler neck system, the cover may be coupled to, for example, a latch structure that biases the door in the cover toward the closed position so that the door and the latch structure both move toward a closed position when the nozzle is removed from the filler neck.

In this arrangement, pushing the nozzle against the ledge 114 will slide the door 104 to expose a flapper that seals the filler neck opening. This sliding motion also causes the latch structure to unlatch, freeing the flapper in the filler neck to move when the nozzle is inserted through the opening 108 in the cover 100. The latch structure may include one or more resilient members that bias the latch structure toward a latched position; in this case, it is possible to couple the door 104 with the latch structure to bias the door 104 toward a closed position as well, thereby causing the door 104 to close at the same time the latch structure latches the flapper. This would eliminate the need for a separate resilient member in the cover 100 itself. Integrating the protective door with the latch structure therefore allows the flapper to be closed and sealed and the sliding door to cover the flapper at substantially the same time without requiring the user to carry out a separate motion to move the door to a closed position.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A cover for a filler neck in a fuel system, comprising:
   a body portion having an opening that corresponds to an opening in the filler neck;
   a protective door coupled to the body portion, wherein the door is movable in a non-arcuate fashion between an open position that exposes the opening in the body portion and a closed position that covers the opening in the body portion; and
   a ledge that protrudes from the door, wherein the ledge comprises a plurality of projections.

2. The cover of claim 1, wherein at least one of the body portion, the door, and the ledge are made of plastic.

3. The cover of claim 1, wherein the body portion comprises a channel, and wherein the door is slidable along the channel between the open position and the closed position.

4. The cover of claim 3, further comprising:
   a slot formed in the channel and extending from the opening; and
   a retainer attached to the door to retain the door in the channel, wherein the retainer moves within the slot as the door is moved between the open position and the closed position.

5. A cover for a filler neck in a fuel system, comprising:
   a body portion having an opening that corresponds to an opening in the filler neck;
   a protective door coupled to the body portion, wherein the door is movable in a non-arcuate fashion between an open position that exposes the opening in the body portion and a closed position that covers the opening in the body portion;
   a ledge that protrudes from the door; and
   a resilient member that biases the door to the closed position.

6. The cover of claim 1, wherein the body portion comprises a pocket that accommodates at least a portion of the door.

7. The cover of claim 6, further comprising at least one resilient member disposed in the pocket, wherein said at least one resilient member biases the door toward the closed position.

8. The cover of claim 1, wherein the cover further comprises a second plurality of projections disposed on the body portion.

9. The cover of claim 8, wherein at least one of the plurality of projections and the second plurality of projections has a beveled surface.

10. The cover of claim 8, wherein at least one of the plurality of projections and the second plurality of projections has a contoured surface.

11. The cover of claim 8, wherein the plurality of projections and the second plurality of projection interleave when the door is in the closed position.

12. A cover for a filler neck in a fuel system, comprising:
   a body portion having an opening that corresponds to an opening in the filler neck;
   a protective door coupled to the body portion, wherein the door is movable in a non-arcuate fashion between an open position that exposes the opening in the body portion and a closed position that covers the opening in the body portion;
   a first ledge that protrudes from the door; and
   a second ledge that protrudes from the body portion, wherein the ledge and the second ledge cooperate so that the door is movable toward the open position when a fuel nozzle is pressed against at least one of the first ledge and the second ledge toward the opening in the filler neck.

13. The cover of claim 12, wherein the body portion comprises a channel, and wherein the door is slidable along the channel between the open position and the closed position.

14. The cover of claim 13, further comprising a resilient member that biases the door to the closed position.

15. The cover of claim 12, wherein at least one of the first ledge and the second ledge comprises a plurality of projections.

16. The cover of claim 15, wherein at least one of the plurality of projections has a beveled surface.

17. The cover of claim 8, wherein at least one of the plurality of projections has a contoured surface.

* * * * *